: 3,272,772
FILLED POLYMER COMPOSITIONS
Joseph L. Russell, Ridgewood, N.J., assignor to The Dow Chemical Company, Midland, Mich., a corporation of Delaware
No Drawing. Filed Aug. 30, 1961, Ser. No. 134,863
8 Claims. (Cl. 260—41)

This invention relates to new compositions of matter and methods for their production. More particularly, this invention pertains to novel fillers for chlorinated high density polyethylene, compositions comprising chlorinated high density polyethylene and the novel fillers and to methods for making such fillers.

The filling of plastic compositions and its desirability are well known. In particular, it is known to fill ethylene polymer compositions, including chlorinated high density polyethylene compositions, with a wide variety of filling materials. A problem is found to exist in connection with such practices, namely, that as fillers are added to chlorinated high density polyethylene the tensile strengths and other valuable properties of the composition, such as flexibility and impact strength, are adversely affected. Furthermore, as the amount of filler is increased the tensile strength and other physical characteristics of the composition are further reduced.

It is, therefore, an object of this invention to provide fillers for chlorinated high density polyethylene which do not affect the properties of the composition materials as adversely as comparable known substances. A further object of the present invention is the provision of fillers which improve the properties of chlorinated high density polyethylene. Another object of this invention is the provision of methods for the production of such fillers. Still a further object of the present invention is the provision of filled chlorinated high density polyethylene compositions having improved properties. These and other objects and advantages are obtained in accordance with the practice of this invention as will appear more clearly hereafter.

It has now been discovered, and the discovery forms the basis of this invention, that mineral compounds employed as fillers for chlorinated high density polyethylene and compositions made with mineral fillers are improved by treatment of the fillers with polymerizable polar vinyl monomers. The fillers are treated with the vinyl monomers in such a manner that the filler retains adsorbed on its surface a small amount of monomer. This can be accomplished by treating the filler with the monomer itself, or by contacting the filler with a solution of the monomer in an inert liquid. Excess monomer is removed from the filler and the filler is ready for use in chlorinated high density polyethylene.

Monomers which can be employed in the practice of the present invention are polymerizable vinyl monomers having a polar group, and include vinyl ethers, vinyl esters, vinyl amides, vinyl nitriles, vinyl halides, polymerizable acids of the acrylic acid series, and vinyl silanes. Representative specific examples of polymerizable vinyl monomers which can be utilized in the treatment of fillers in accordance with this invention are vinylidene chloride, acrylonitrile, vinylidene cyanide, vinyl acetate, vinyl propionate, methyl methacrylate, acrylic acid, methacrylic acid, acrylamide, vinyl chloracetate, ethyl acrylate, vinyl triethoxy silane and the like. All of these compounds are monoethylenically unsaturated, i.e., they contain a single $CH_2=C<$ group.

The filling materials which are improved by the treatment of this invention are normally solid inorganic compounds including salts, acids, bases and oxides. Representative compounds which can be processed in this invention are alumina, barytes, calcium hydroxide, calcium carbonate, lime, calcium silicate, calcium aluminum silicate, ferrous oxide, hematite, magnetite, lead chromate, litharge, red lead, magnesium hydroxide, mercuric oxide, calomel, vermillion, silica, silicic acid, kaolin, diatomaceous earth, china clay, fuller's earth, titanium dioxide, magnesium carbonate, zinc oxide and zinc sulfide. These fillers can be used in their various allotropic or hydrated forms and should, of course, be in finely divided condition. Preferably the fillers have a very high degree of division in order to provide a large quantity of surface area to adsorb vinyl monomer. When the monomer is to be applied to the filler from a solution of the monomer, a monomer solvent should be selected which does not dissolve or react with the filler. For example, if water attacks the filler, organic liquids such as hydrocarbons, chlorinated hydrocarbons, alcohol or ether can be used as a solvent for the polar monomer. After the filler and the monomer solution have been thoroughly mixed, preferably at high speed, the treated filler can be separated from the solution by decantation or filtering. Subsequently, the treated filler should be dried to remove excess monomer and solvent, preferably at room temperature or at only slightly elevated temperature.

The fillers, treated with polar vinyl monomers in accordance with this invention, are then mixed with chlorinated high density polyethylene to produce uniform dispersions of the treated filler throughout the body of the plastic. This can be accomplished in an internal mixer such as a Banbury type mixer or a screw extruder or on an external mixer such as a differential roll mill.

Particularly desirable results are obtained when the ratio of the filler to the chlorinated high density polyethylene is between about 1:4 and 4:1, especially between about 1:1.5 and 3:1. The filler composition of this invention can contain other materials in addition to chlorinated high density linear polyethylene and treated fillers such as dyes, heat stabilizers, light stabilizers, antioxidants and other modifiers so long as the amount of the additional modifiers is not such as to produce an unduly adverse affect upon final properties of the composition. These compositions can be fabricated by molding techniques such as compression or injection molding, by calendering or extrusion to form a variety of useful, shaped articles as floor tiles, toys, wire coating, containers and the like.

The chlorinated polyethylene employed in the present invention can be made by chlorinating high density polyethylene made by the low pressure process using Phillips or Ziegler type catalysts to produce essentially linear, unbranched polyethylene. Such polyethylenes have densities of at least 0.940 gram per cubic centimeter and melt indexes of from about 0.1 to about 100. By the term polyethylene as used throughout this specification, it is meant to include not only homopolymers of ethylene but polymers of ethylene containing small amounts of other monomers such as vinyl acetate, ethyl acrylate and alpha olefins, for example, propylene and 1-butene. Such polyethylenes, when chlorinated to contain in the final polymer about 5 percent to about 75 percent (especially from about 40 percent to 60 percent) chlorine, are suitable for use in the compositions of this invention.

3

The following examples illustrate the invention but the invention is not limited thereto. All parts and percentages are parts and percentages by weight, unless otherwise specified.

*Example I*

A solution is made by dissolving 130 grams of acrylamide in 870 grams of water. To this solution there was added 300 grams of finely powdered calcium carbonate. This composition was mixed for ½ hour on a Waring blender run at full speed, filtered and dried overnight at room temperature under vacuum of 28 inches of mercury. High density, linear polyethylene having a melt index of 0.5 is chlorinated so that the final product contains 45 percent chlorine. Forty-five parts of the treated calcium carbonate is intimately mixed with 55 parts of the chlorinated polyethylene on a hot differential roll mill (temperature of about 125° C.) for 6 minutes. A compression molded specimen of this composition has an ultimate tensile strength of 3,850 pounds per square inch and an elongation of 10 percent.

By contrast, a test specimen of an otherwise substantially identical composition, except that the acrylamide treatment of the filler is omitted, has an ultimate tensile strength of 3,500 pounds per square inch.

*Example II*

Sixty parts of finely divided calcium carbonate treated as in Example I is blended with 40 parts of low pressure, unbranched chlorinated polyethylene having a chlorine content of 45 percent. The polyethylene has a melt index of 0.5 before chlorination. Mixing is carried out on a rolling mill under the conditions given in Example I. A test specimen made by compression molding is found to have an ultimate tensile strength of 3,950 pounds per square inch and an elongation of 5 percent. By way of contrast a test specimen made as in Example II except that treatment of the calcium carbonate with acrylamide is omitted, has an ultimate tensile strength of 3,000 pounds per square inch.

*Example III*

A composition is made by blending 75 parts acrylamide treated $CaCO_3$, as in Example I, with 25 parts of chlorinated high density polyethylene having an original melt index of 0.5 containing 45 percent chlorine. Test specimens manifest an ultimate tensile strength of 3,400 pounds per square inch whereas a composition containing 75 parts of untreated calcium carbonate and 25 of the chlorinated polyethylene has an ultimate tensile strength of 2,200 pounds per square inch.

*Example IV*

Seventy-five parts of calcium carbonate treated with acrylamide as in Example I is milled with 25 parts of chlorinated low pressure polyethylene having a chlorine content of 50 percent. The polyethylene from which the chlorinated product is made has a melt index of 3.8. The milling is continued for 6 minutes at a temperature maintained between 110° C. and 140° C. The tensile strength of a flash molded specimen is 3,800 pounds per square inch. In contrast, flash molded products of the same composition made with calcium carbonate that has not been treated have a tensile strength of 2,220 pounds per square inch and are less flexible and have lower impact strength than moldings of the composition of Example IV.

*Example V*

An aqueous solution of methacrylic acid is utilized to treat powdered calcium carbonate. The calcium carbonate is added to the solution and the mixture is stirred at high speed for 30 minutes with a mechanical stirrer. The treated calcium carbonate is recovered by filtration and is dried at 72° F. for 15 hours at high vacuum. Seventy-five parts of the so treated filler is hot blended with 25 parts of chlorinated high density polyethylene containing 50 percent by weight of combined chlorine. The original polyethylene had a melt index of 3.8. Test specimens of this composition possess an ultimate tensile strength of 2,940 pounds per square inch. When this example is repeated, except that the pretreatment of the filler with methacrylic acid is omitted for the purpose of control, test specimens obtained have an ultimate tensile strength of 2,540 pounds per square inch.

In a manner similar to the foregoing examples, calcium carbonate and other normally solid inorganic filler compounds such as those named above can be treated with acrylamide or polymerizable vinyl monomers of the class herein defined to produce improved fillers for chlorinated linear polyethylene and filled plastic compositions having superior physical properties. Such plastic compositions can find application in a variety of useful articles including floor tiles and electrical wire insulation.

As many different embodiments of this invention may be made without departing from the spirit and scope thereof, it is to be understood that the invention is not limited to specific details thereof herein disclosed.

That which is claimed is:

1. A composition of matter which comprises from 1 to 4 parts by weight of chlorinated high density polyethylene and uniformly dispersed throughout said chlorinated polyethylene from 1 to 4 parts by weight of an inorganic filler having adsorbed thereon a polar group-containing polymerizable vinyl monomer.

2. A composition of matter which comprises from 1 to 4 parts by weight of chlorinated polyethylene and uniformly dispersed throughout said chlorinated polyethylene from 1 to 4 parts by weight of a finely divided inorganic filler compound having adsorbed thereon a small amount of acrylamide.

3. A composition of matter which comprises from 1 to 4 parts by weight of chlorinated polyethylene and uniformly dispersed throughout said chlorinated polyethylene from 1 to 4 parts by weight of a finely divided inorganic filler compound having adsorbed thereon a small amount of methacrylic acid.

4. A composition of matter which comprises from 1 to 4 parts by weight of chlorinated polyethylene and uniformly dispersed throughout said chlorinated polyethylene from 1 to 4 parts by weight of an inorganic filler having adsorbed thereon a polar-group containing polymerizable vinyl monomer, said inorganic filler being calcium carbonate.

5. A composition of matter which comprises from 1 to 4 parts by weight of chlorinated polyethylene and from 1 to 4 parts by weight of finely divided calcium carbonate uniformly dispersed throughout said chlorinated polyethylene, said calcium carbonate having adsorbed thereon a small amount of acrylamide.

6. A composition of matter which comprises from 1 to 4 parts by weight of chlorinated polyethylene and from 1 to 4 parts by weight of finely divided calcium carbonate uniformly dispersed throughout said chlorinated polyethylene, said calcium carbonate having adsorbed thereon a small amount of methacrylic acid.

7. A composition of matter which comprises chlorinated polyethylene having from about 5 percent to about 75 percent chlorine in the polymer molecule and calcium carbonate uniformly dispersed throughout said chlorinated polyethylene, said calcium carbonate having adsorbed thereon a small amount of acrylamide, said chlorinated polyethylene and said calcium carbonate being present in the composition in the ratio of from about 4:1 to about 1:4.

8. A composition of matter which comprises chlorinated linear polyethylene having from about 40 percent to about 60 percent chlorine in the polymer molecule, the original polyethylene having a density of 0.940 gram per cubic centimeter and a melt index of from about 0.1 to about 100 and calcium carbonate having adsorbed thereon a small amount of acrylamide, the ratio of said calcium carbonate to said chlorinated linear polyethylene in the composition being between about 1:1.5 and about 3:1.

References Cited by the Examiner

UNITED STATES PATENTS

| | | | |
|---|---|---|---|
| 2,728,732 | 12/1955 | Arnett | 260—41 |
| 2,749,248 | 6/1956 | Benson | 260—41 |
| 2,841,504 | 7/1958 | Liggett | 106—308 |
| 2,913,432 | 11/1959 | Gulick | 260—41 |
| 2,934,512 | 4/1960 | Godshalk | 260—41 |
| 2,948,632 | 8/1960 | Albert et al. | 106—308 |
| 3,022,185 | 2/1962 | Delfosse | 106—308 |
| 3,023,180 | 2/1962 | Canterino et al. | 260—94.9 |

FOREIGN PATENTS

| | | |
|---|---|---|
| 584,620 | 1/1947 | Great Britain. |
| 750,809 | 6/1956 | Great Britain. |

MORRIS LIEBMAN, *Primary Examiner.*

WILLIAM H. SHORT, *Examiner.*

B. S. LEON, K. B. CLARKE, J. S. WALDRON,
*Assistant Examiners.*